United States Patent [19]

Hitzman

[11] Patent Number: 4,515,700
[45] Date of Patent: May 7, 1985

[54] GELLED ACID COMPOSITION

[75] Inventor: Donald O. Hitzman, Bartlesville, Okla.

[73] Assignee: Phillips Petroleum Company, Bartlesville, Okla.

[21] Appl. No.: 487,367

[22] Filed: Apr. 21, 1983

[51] Int. Cl.³ ................................................ C09K 3/00
[52] U.S. Cl. .......................... 252/8.55 R; 252/315.3; 536/114
[58] Field of Search ............ 252/8.55 R, 316, 8.55 C; 536/114, 102, 112

[56] References Cited

U.S. PATENT DOCUMENTS

| | | | |
|---|---|---|---|
| 3,355,447 | 11/1967 | O'Connell | 260/209 |
| 3,801,502 | 4/1974 | Hitzman | 252/8.55 |
| 3,960,736 | 6/1976 | Free et al. | 252/8.55 |
| 4,044,833 | 8/1977 | Volz | 166/307 |
| 4,095,991 | 6/1978 | Falcoz et al. | 106/208 |
| 4,103,742 | 8/1978 | Swanson | 166/259 |
| 4,143,175 | 3/1979 | Whelan | 426/582 |
| 4,146,486 | 3/1979 | Hessert et al. | 252/8.55 |
| 4,205,724 | 6/1980 | Swanson et al. | 166/8.55 |
| 4,244,826 | 1/1981 | Swanson | 252/8.55 |

Primary Examiner—Josephine L. Barr

[57] ABSTRACT

A stable polysaccharide gelled acid is produced by heating a polysaccharide solution which has not previously been heated at temperatures in excess of about 60° F. at a temperature of from about 60° C. up to the boiling point of the polysaccharide solution for about 5 minutes to 120 minutes and subsequently adding acid. Preferably, the polysaccharide solution when heated contains a phenol or aldehyde.

13 Claims, No Drawings

GELLED ACID COMPOSITION

This invention relates to the production of improved gelled acid compositions.

It is known that gelled acids can be used as fracturing fluids in oil or gas containing formations to increase production of the desired oil or gas.

Such gelled acids are generally formed by admixing any one of a variety of gelling agents including polymers such as polysaccharides with an aqueous solution of the acid. However, when a polysaccharide is utilized as the gelling agent, the resulting gelled acid is unstable due to the susceptibility of the polysaccharide gelling agent to acid hydrolysis. Accordingly, in order to render such compositions useful as a fracturing fluid, it is necessary to overcome the problem of gelled acid instability.

It is thus an object of this invention to provide a stabilized polysaccharide gelled acid.

It is another object of the present invention to provide a process for making a stabilized polysaccharide gelled acid.

Other aspects, objects, and the several advantages of the present invention are apparent from this specification and the claims.

In accordance with the present invention I have discovered that a polysaccharide solution which has not previously been heat treated at temperatures above about 60° C. can be used as a gelling agent for acid solutions.

Any polysaccharide solution which has not been previously heated to temperature above about 60° C. may be utilized in the present invention. Examples of suitable polysaccharides include xanthan, dextrans, levans, pullulans, glucans, mannans, glucosylglucan, phosphomannan and mixtures thereof.

Presently preferred are the polysaccharides produced by bacteria of the genus Xanthomonas. These polysaccharides are commonly referred to as xanthan gums or xanthan biopolymers and are available commercially.

Most preferred is the polysaccharide xanthan produced by *Xanthomonas campestris*, NRRL B-1459. Xanthan contains mannose, glucose, glucurionic acid, O-acetyl radicals and acetal-linked pyruvic acid in the molar ratio of 2:2:1:1:0.5.

A polysaccharide solution is formed by dispersing the polysaccharide in any agent, typically an aqueous medium, which will solubilize the polysaccharide.

Generally, the polysaccharide solution is heated in the range from about 60° C. up to the boiling point of the polysaccharide solution and preferably from about 80° C. up the boiling point of the polysaccharide solution.

Generally, the time for heating will be from about 5 minutes to about 120 minutes.

In a presently preferred embodiment of the present invention, the polysaccharide solution when heated contains additionally a phenol or aldehyde.

Among the applicable phenols, those that contain 6 to 10 carbon atoms per moleculer are preferred. Examples of such phenols include phenol, o-cresol, m-cresol, p-cresol, catechol, resorcinol, hydroquinone, 2-ethylphenol, 3-isopropylphenol, 4-butylphenol, 1-naphthol, 2-naphthol, and mixtures thereof.

Among the applicable aldehydes, those preferred contain 2 to 12 carbon atoms per moleculer. Examples of such aldehydes include acetaldehyde, propionaldehyde, benzaldehyde, vanillin, and mixtures thereof.

The amount of phenol or aldehyde employed in this invention will generally be from about 0.05 to about 5 weight percent, preferably from about 0.1 to about 1 weight percent based on the weight of the polysaccharide.

Following heating of the polysaccharide solution, an acid is added to the treated polysaccharide in the quantity of from about 0.4 to about 60 weight percent of the polysaccharide.

Acids useful in the practice of the invention include any acid which is effective in increasing the flow of fluids, e.g., hydrocarbons through a formation. Examples of such acids are non-oxidizing mineral acids such as hydrochloric acid, hydrofluoric acid, and phosphoric acid, and $C_1$–$C_6$ organic acids such as formic acid, acetic acid, propionic acid, butyric acid, citric acid and mixtures thereof, and combinations of inorganic and organic acids. The concentration or strength of the acid can vary depending upon the type of acid, the type of formation being treated, the above-stated compatibility requirements, and the results desired in the particular treating operation.

The resulting stabilized polysaccharide gelled acid is commercially useful, for example, as a fracturing fluid.

The following examples illustrate the present invention.

EXAMPLES

Example I

Polysaccharide Treatment

The polysaccharide employed in the following examples was xanthan produced from *Xanthamonas campestris* and available commercially from the Kelco Division, Merck and Company, Rahway, N.J.

Xanthan solutions were prepared by dissolving 2.75 grams of xanthan powder in 100 cc water.

The general polysaccharide treatment procedure employed involved placing 20 g of 2.75% xanthan polysaccharide solution in stoppered 250 mL Erlenmeyer flask, adding treating agent (phenol or aldehyde) as appropriate, then heating to about 90° C. for 30 minutes. When heating was complete, 200 mL of tap water (Example II) or 200 mL of acid solution (Example III) was added, and the solution stirred until homogeneous. The aqueous samples (Example II) were then divided into two portions, each portion diluted with an equal volume of (a) water or (b) aqueous HCl, and viscosities measured. Samples were then stirred for an additional 24 hours, and viscosities measured again. Alternatively, the acidified samples (Example III) were stirred about 15 hours, then diluted 1:1 with tap water for viscosity measurement.

The viscosity of the resulting solution was measured with a Brookfield model LVF viscometer equipped with a UL adapter at 6 rpm and room temperature.

EXAMPLE II

A solution containing 2.75% of xanthan was prepared as described in Example I, and 20 g aliquots treated with a variety of treating agents as described above, diluted with 200 mL of tap water, stirred about 15 hours, then split into two fractions. One fraction (a) was diluted 1:1 with tap water and the other (b) diluted 1:1 with about 11% solution (30 mL concentrated HCl per 100 mL solution). Viscosities were measured at the time of mixing and about 48 hours later.

TABLE I

| | | Viscosity (cp) | | |
|---|---|---|---|---|
| | | Initial | | 48 Hours |
| Sample | Added Reagent | Water (a) | Acid (b) | Water (a) | Acid (b) |
| 1 | None* | 44.0 | 16.6 | 45.5 | 9.1 |
| 2 | None | 63.1 | 25.9 | 67.4 | 13.2 |
| 3 | 1% Phenol | 66.8 | 25.6 | 64.4 | 10.9 |
| 4 | 2% Phenol | 72.8 | 26.0 | 77.7 | 12.9 |
| 5 | 0.5% o-Vanillin | 73.3 | 28.1 | 72.7 | 13.7 |
| 6 | 1% o-Vanillin | 69.1 | 29.5 | 77.8 | 13.4 |
| 7 | 0.5% Vanillin | 72.0 | 26.4 | 78.7 | 13.5 |
| 8 | 1% Vanillin | 76.7 | 28.5 | 80.9 | 14.6 |
| 9 | 0.2% HCHO | 65.2 | 22.3 | 69.4 | 11.2 |
| 10 | 0.5% HCHO | 71.4 | 23.9 | 68.7 | 12.6 |

*Sample not heated

The above data demonstrate that merely heating the polysaccharide (Sample 2) results in a substantial increase in viscosity over an unheated polysaccharide (Sample 1). Furthermore, heating the polysaccharide in the presence of agents such as phenol, o-vanillin and vanillin in some instances results in higher viscosities than achieved by mere heating of the polysaccharide (see Samples 4–8). Samples 9 and 10 demonstrate that the use of formaldehyde does not give enhanced viscosities for gelled acid solutions compared to heat treated Sample 2.

Example III

Several 20 g 2.75% xanthan solution samples were heat treated as described above and then diluted with (a) 200 mL of tap water or (b) 200 mL of about 6% HCl solution (15 mL concentrated HCl per 100 mL solution). Samples were stirred about 15 hours, then divided into four fractions each—viscosity of one fraction was measured immediately, while the other samples were sealed in serum bottles under a nitrogen atmosphere for viscosity measurement after 24, 72 and 192 hours of storage at 45° C.

Group I Samples (Samples 1–4) employed a sample of xanthan gum which had been sterilized prior to drying, i.e., the biopolysaccharide had been treated to conditions of temperature within the contemplation of the present invention prior to redissolution and treatment according to the present invention.

In contrast, Group II Samples (Samples 5–8) employed bispolysaccharide which had been recovered by alcohol precipitation, followed by drying at 125° F. (52° C.). Thus, Samples 5–8 employed xanthan gum which had not previously been subjected to heating conditions within the treating range disclosed herein.

TABLE II

| | Added | Viscosity | | | | | | | |
|---|---|---|---|---|---|---|---|---|---|
| Sam- | Re- | Initial | | 24 Hrs. | | 72 Hrs. | | 192 Hrs. | |
| ple | agent | (a) | (b) | (a) | (b) | (a) | (b) | (a) | (b) |
| I | | | | | | | | | |
| 1 | None* | 50.3 | 10.6 | 54.4 | 8.9 | 49.2 | 6.2 | 50.9 | 4.1 |
| 2 | None | 51.9 | 8.8 | 45.4 | 7.2 | 40.9 | 6.0 | 39.1 | 3.7 |
| 3 | 2% Phenol | 44.0 | 8.2 | 37.4 | 6.9 | 37.2 | 5.4 | 39.6 | 3.7 |
| 4 | 1% o-Vanillin | 53.7 | 7.6 | 48.4 | 6.6 | 44.3 | 5.3 | 41.6 | 3.6 |
| II | | | | | | | | | |
| 5 | None* | 36.4 | 7.8 | 36.8 | 7.2 | 35.3 | 6.0 | 35.0 | 3.6 |
| 6 | None | 51.1 | 10.3 | 54.5 | 9.2 | 52.8 | 7.0 | 53.3 | 5.1 |
| 7 | 2% | 60.9 | 11.0 | 59.1 | 9.9 | 59.4 | 7.6 | 59.3 | 5.4 |
| 8 | Phenol 1% o-Vanillin | 65.4 | 12.4 | 62.3 | 11.3 | 62.8 | 8.4 | 65.6 | 5.9 |

*Redissolved sample not heated

The data from Sample Group I demonstrate that a polysaccharide previously heated treated, dried, and then redissolved in aqueous solution and treated as in the present invention (Samples 2–4) does not result in a polysaccharide gelled acid of enhanced viscosity. Conversely, the data from Sample Group II show that use of a polysaccharide solution not previously heated as in Group I results in a polysaccharide gelled acid of enhanced viscosity (Samples 6–8).

Reasonable variations and modifications are possible from the foregoing without departing from the spirit and scope of the present invention.

I claim:

1. A stabilized polysaccharide gelled acid composition produced by the process which comprises:
   (a) heating an aqueous solution of at least one polysaccharide sellected from the group consisting of xanthan, dextrans, levans, pullulans, glucans, mannans, glucosylglucan and phosphomannan which has not been previously heated to temperatures above about 60° C. at a temperature in the range of 60° C. to the boiling point of said solution for about 5 minutes to 2 hours; and
   (b) thereafter adding from about 0.4 to about 60 weight percent of at least one acid selected from a non-oxidizing mineral acid of the group consisting of hydrochloric acid, hydrofluoric acid and phosphoric acid or a $C_1$ to $C_6$ organic acid.

2. A composition according to claim 1 wherein said polysaccharide is xanthan.

3. A composition according to claim 1 wherein there is added to said aqueous solution of at least one polysaccharide from about 0.5 to about 5.0 weight percent of at least one phenol having 6 to 10 carbon atoms per molecule or an aldehyde having 2 to 12 carbon atoms per molecule prior to heating.

4. A composition according to claim 3 wherein said phenol is phenol.

5. A composition according to claim 1 wherein said organic acid is at least one selected from the group consisting of formic acid, acetic acid, propionic acid, butyric acid, and citric acid.

6. A composition according to claim 3 wherein said polysaccharide is xanthan, said acid is hydrochloric acid, and said phenol is phenol.

7. A composition according to claim 3 wherein said polysaccharide is xanthan, said acid is hydrochloric acid, and said aldehyde is vanillin.

8. A composition according to claim 3 wherein said polysaccharide is xanthan, said acid is hydrochloric acid, and said aldehyde is o-vanillin.

9. A process for preparing a stabilized polysaccharide gelled and comprising:
   (a) heating an aqueous solution of at least one polysaccharide selected from the group consisting of xanthan, dextrans, levans, pullulans, glucans, mannans, glucosylglucan and phosphomannan which has not been previously heated to temperatures above about 60° C. at a temperature in the range of 60° C. to the boiling point of said solution for about 5 minutes to 2 hours; and (b) thereafter adding from about 0.4 to about 60 weight percent of at least one acid selected from a non-oxidizing mineral acid of the group consisting of hydrochloric acid, hydrofluoric acid and phosphoric acid or a $C_1$ to $C_6$ organic acid.

10. A process according to claim 9 wherein said polysaccharide is xanthan.

11. A process according to claim 9 wherein there is added to said aqueous solution of at least one polysaccharide from about 0.5 to about 5.0 weight percent of at least one phenol having 6 to 10 carbon atoms per molecule or an aldehyde having 2 to 12 carbon atoms per molecule prior to heating.

12. A process according to claim 11 wherein said phenol is phenol.

13. A process according to claim 9 wherein said organic acid is at least one selected from the gorup consisting of formic acid, acetic acid, propionic acid, butyric acid, and citric acid.

* * * * *